(12) United States Patent
Xinglong et al.

(10) Patent No.: US 9,858,149 B2
(45) Date of Patent: Jan. 2, 2018

(54) ACCESSING OVERLAY MEDIA OVER A NETWORK CONNECTION

(75) Inventors: He Xinglong, Beijing (CN); Yang Kenan, Beijing (CN); Kun Cong, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 991 days.

(21) Appl. No.: 13/342,394

(22) Filed: Jan. 3, 2012

(65) Prior Publication Data

US 2013/0173744 A1    Jul. 4, 2013

(51) Int. Cl.
*G06F 15/16* (2006.01)
*G06F 11/14* (2006.01)
*G06F 3/06* (2006.01)

(52) U.S. Cl.
CPC .......... *G06F 11/1415* (2013.01); *G06F 3/065* (2013.01); *G06F 3/067* (2013.01); *G06F 3/0617* (2013.01); *G06F 3/0623* (2013.01); *G06F 3/0659* (2013.01)

(58) Field of Classification Search
CPC .... G06F 3/061; G06F 3/0617; G06F 11/1415; G06F 3/067; G06F 3/0659; G06F 3/0676
See application file for complete search history.

(56) References Cited

U.S. PATENT DOCUMENTS

| 8,078,583 | B2  | 12/2011 | Prahlad et al. |
| 8,112,471 | B2* | 2/2012  | Wei ............... H04L 67/1008 709/202 |
| 2002/0056031 | A1  | 5/2002  | Skiba et al. |
| 2004/0139128 | A1* | 7/2004  | Becker et al. ............... 707/204 |
| 2006/0155930 | A1* | 7/2006  | Birrell et al. ............... 711/113 |
| 2007/0186070 | A1  | 8/2007  | Federa et al. |
| 2007/0266027 | A1* | 11/2007 | Gattegno et al. ............... 707/8 |
| 2009/0300642 | A1* | 12/2009 | Thaler et al. ............... 718/105 |
| 2009/0327370 | A1* | 12/2009 | Schmidt ............... 707/205 |
| 2010/0037041 | A1  | 2/2010  | Joshi et al. |

(Continued)

FOREIGN PATENT DOCUMENTS

| CN | 101853363 A   | 10/2010 |
| CN | 102055730 A   | 5/2011  |
| CN | 101449268 B   | 12/2011 |
| WO | 2006/124239 A2 | 11/2006 |
| WO | 2013103705 A1 | 11/2013 |

OTHER PUBLICATIONS vnetworkstack.com, "Virtual Networking Connecting Datacenter & Cloud", Retrieved on: Sep. 21, 2011, Available at: http://www.vnetworkstack.com/cloudbridge.html, 2 pages.

(Continued)

*Primary Examiner* — Joseph Greene
(74) *Attorney, Agent, or Firm* — Harness, Dickey & Pierce, P.L.C.

(57) ABSTRACT

The subject disclosure is directed towards providing overlay media to a computing device over a network connection. An input/output (I/O) filter on the embedded device/system may communicate data with the overlay media via a storage service. The I/O filter driver may connect to the storage service using a universal identifier. When an application issues read operations and/or write operations directed to local storage media, the I/O filter driver redirects the read operations and/or the write operations to the storage service over the network connection.

20 Claims, 6 Drawing Sheets

(56) References Cited

U.S. PATENT DOCUMENTS

| | | | |
|---|---|---|---|
| 2010/0115606 A1 | 5/2010 | Samovskiy et al. | |
| 2010/0281080 A1 | 11/2010 | Rajaram et al. | |
| 2010/0332401 A1* | 12/2010 | Prahlad | G06F 17/3002 705/80 |
| 2011/0137973 A1 | 6/2011 | Wei et al. | |
| 2011/0145580 A1 | 6/2011 | Auradkar et al. | |
| 2011/0289194 A1 | 11/2011 | Lee | |
| 2011/0296000 A1 | 12/2011 | Ferris et al. | |
| 2012/0311263 A1 | 12/2012 | Kamath et al. | |

OTHER PUBLICATIONS

Hewlett-Packard, "Using the Enhanced Write Filter", Jul. 2008, Available at: http://bizsupport.austin.hp.com/bc/docs/support/SupportManual/c01568161/c01568161.pdf, 7 pages.

Ranjan, et al., "Decentralized Overlay for Federation of Enterprise Clouds", In Proceedings of Handbook of Research on Scalable Computing Technologies, Jan. 2010, pp. 191-217.

Pianese, et al., "Toward a Cloud Operating System", In Proceedings of IEEE/IFIP Network Operations and Management Symposium Workshops, Apr. 19-23, 2010, pp. 335-342.

Hwang, et al., "Trusted Cloud Computing with Secure Resources and Data Coloring", In Proceedings of IEEE Internet Computing, vol. 14, Issue 5, Sep.-Oct. 2010, pp. 14-22.

"International Search Report and Written Opinion for PCT Application No. PCT/US2013/020126", dated Apr. 19, 2013, 10 pages.

"Extended Search Report issued in European Patent Application No. 13733872.9", dated Jul. 9, 2015, 8 pages.

"First Office Action Issued in Chinese Patent Application No. 201380004727.0", dated Dec. 30, 2015, 14 Pages.

"Second Office Action Issued in counterpart Chinese Patent Application No. 201380004727.0", dated Sep. 3, 2016, 16 Pages.

Response to Extended Search Report issued in counterpart European Patent Application No. 13733872.9 dated Jul. 9, 2015, response submitted Jan. 27, 2016, 13 pages.

Response to First Office Action Issued in counterpart Chinese Patent Application No. 201380004727.0 dated Dec. 30, 2015, response submitted May 16, 2016, 14 Pages.

"Third Office Action and Search Report Issued in Chinese Patent Application No. 201380004727.0", dated Mar. 10, 2017, 15 Pages.

"Office Action Issued in Chinese Patent Application No. 201380004727.0", Dated: Aug. 28, 2017, 10 pages.

\* cited by examiner

ACCESSING OVERLAY MEDIA OVER A NETWORK CONNECTION

BACKGROUND

Various devices/systems may include an embedded platform comprising an operating system, applications and various other files. For example, the various devices/systems may include portable ultrasound machines, Global Positioning System (GPS) devices, Automated Teller Machines (ATMs), devices that power large construction machinery and/or the like. The operating system, the applications and important user data may be configured into a run-time image on which the devices/systems boot up and operate. For instance, Windows Embedded Technology, including the Embedded Windows operating system, integrates an existing Information Technology (IT) infrastructure and enables various services, such as management, security, data synchronization with a network or another device/system, usage profiling, location services, advertising services, business intelligence and line-of-business applications, access to data regarding device capabilities and services and/or the like.

The Embedded Windows operating system includes an optional feature known as filters (e.g., write filters), which redirect a user's change made on the operating system to an overlay, instead of making the change on the hard disk. As a result, the operating system is protected from malicious/accidental modifies and remains in a same state through a device/system reboot. The current design of write filters may employ a RAM-based or a disk-based overlay (e.g., hard disk) as the overlay type. A size limit for the overlay media is predefined, such that filter may access part of a physical RAM or hard disk without impacting the user's normal activities. As more changes are made to the operating system, the overlay increases in size (e.g., a number of bytes). Eventually, the overlay media exceeds the size limit, which causes a crash, an unexpected reboot and other deleterious effects.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards communicating data for storage on overlay media over a network connection. In one aspect, the network connection refers to a connection to the Internet where the overlay media comprises a shared storage resource being hosted by a cloud computing service. In another aspect, the network connection refers to a local area network (LAN) connection where the overlay media comprises a shared storage resource being hosted by a LAN service that may or may not simulate the cloud computing service. The shared storage resource may be a folder, directory or any other file system object for storing files.

In one aspect, an input/output (I/O) filter, such as a write filter driver, provides access to the overlay media via the storage service. After establishing the network connection with the storage service, the I/O filter driver intercepts read operations and write operations directed to protected storage media (e.g., a local or network partition/drive) and redirects the read operations and the write operations associated with files/sectors having overlay protection to the overlay media. In one aspect, the storage service returns data corresponding to the read operations and stores data provided by the write operations on the overlay media. In one aspect, the write operations are applied to an image, such as a snapshot (layer). In another aspect, the write operations are applied to an overlay cache (e.g., RAM) and transferred to the overlay media in response to various events, such as a device/system shutdown.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an input/output (I/O) filter driver that provides utilization of overlay media over a network connection. The I/O filter driver may redirect input/output operations targeted for protected volumes to local, volatile RAM known as an overlay cache and/or network, disk-based overlay media over the Internet or a local area network. In one implementation, when an application issues read operations or write operations directed to a local storage media (e.g., a hard disk), instead of being committed to the protected volume, the I/O filter driver intercepts the read operations and the write operations. The I/O filter driver connects to a storage service associated with the overlay media and communicates the read operations and the write operations to the overlay media.

In one implementation, the I/O filter driver instructs the storage service to store the write operations in the overlay media and to return data from the overlay media corresponding to the read operations for the local storage media. If the write operations are to be committed, the I/O filter driver instructs the storage service to return the write operations of which the I/O filter driver applies to the local storage media. In one implementation, the I/O filter driver maintains a snapshot of a volume on the local storage media that comprises file data from the write operations. In such an implementation, the I/O filter driver stores the file data at corresponding physical file addresses on the local storage media.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage systems in general.

Figure 1:
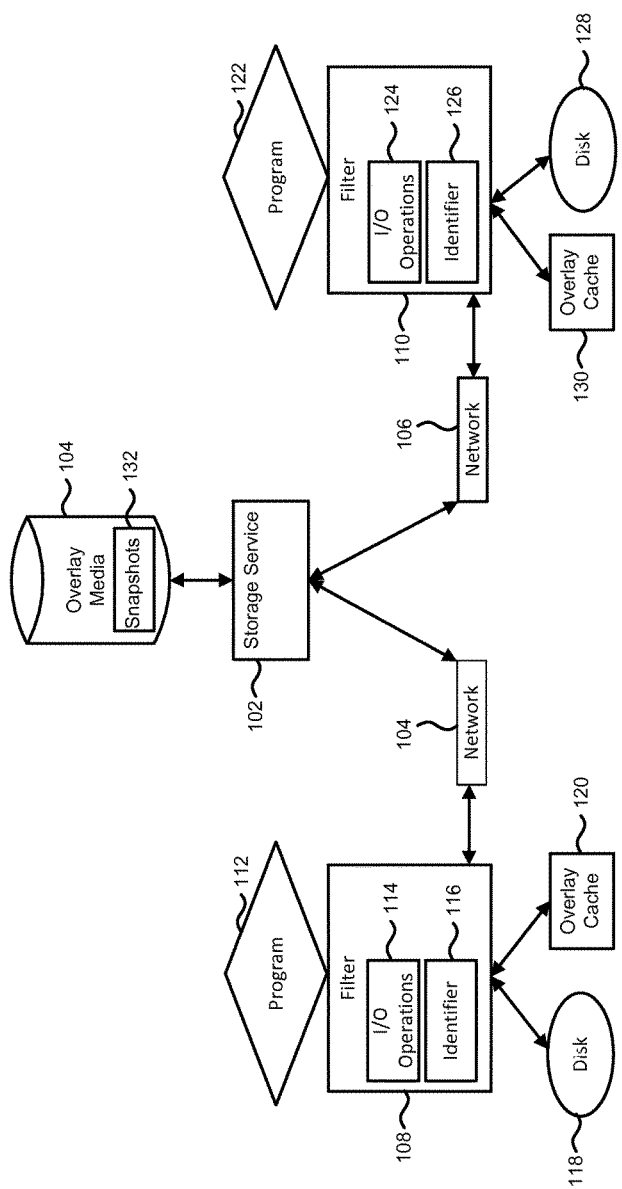
FIG. 1 is a block diagram illustrating an example system for communicating with overlay media over a network connection according to one example implementation.

FIG. 1 is a block diagram illustrating an example system for communicating with overlay media over a network connection according to one example implementation. Components of the example system may include a storage service 102, overlay media 104, and a network 104 and a network 106, which are represented as being coupled to a filter driver 108 and a filter driver 110, respectively. It is appreciated that while FIG. 1 depicts two networks to illustrate that the storage service 102 may support a plurality of computing devices (such as embedded devices/systems) with the overlay media 104, one network connection to one or more computing devices may be employed to practice an implementation of the present disclosure. In one implementation, a first embedded device/system (corresponding to an example program 112) and a second embedded device/system (corresponding to an example program 122), running the filter drivers 108 and 110, respectively, may form a portion of a networked community of users.

In one implementation, the storage service 102 may comprise a hosted service (known as a cloud computing service) that provides access to the overlay media 104 over a network connection, such as the Internet. Accordingly, the overlay media 104 may comprise a portion of shared, configurable storage resources. The storage service 102 may be assigned a common ID (i.e., a Cloud ID) and Uniform Resource Locator (URL) (i.e., a Cloud URL) that the filter driver 108 and/or the filter driver 110 may use to communicate data with the overlay media 104. The common ID may include a Microsoft® Windows® Live ID or a Hotmail® ID associated with a hosted service on a public network. As an alternative, the common ID and URL may be configured for a private hosted service on a proprietary platform for a particular community of users. Alternatively, the storage service 102 may be a hosted service on a shared local area network comprising embedded devices/systems, such as an embedded device/system that executes the filter driver 108 or the filter driver 110.

In one example implementation, the filter driver 108 and the filter driver 110 may include kernel-mode drivers, such as input/output (I/O) drivers of a certain type (e.g., a write filter driver) in a layered driver stack. The filter drivers 108 and 110 may couple to a same layered I/O driver or different ones and intercept I/O operations/requests directed towards file system objects (e.g., files and/or directories) on a storage device/media associated with the lower/underlying layered I/O driver. The filter drivers 108 and 110 in general enable additional functionality with the storage device/media.

When a program 112 (e.g., an operating system component or a user-mode application) initiates input/output operations 114 targeted for overlay-protected volumes on local and/or network storage media, instead of being processed by the underlying input/output driver (e.g., a file system driver, a disk driver and/or the like), the input/output operations 114 may be intercepted by the filter driver 108 and redirected to the overlay media 104. In one example implementation, the filter driver 108 may access a network connection with the storage service 102 using an identifier 116 (e.g., a universal identifier, a system-wide unique identifier and/or the like) and may instruct the storage service 102 to store data corresponding to write operations on the overlay media 104.

When, for instance, the write operations are to be committed to a disk 118, the filter driver 108 may request the data corresponding to the write operations from the storage service 102 and write the data to the protected volumes. Alternatively, the filter driver 108 may retrieve the data from overlay cache 120 prior to being transferred to the overlay media 104. The filter driver 108 may delete such data from the overlay media 104 and/or the overlay cache 120 instead of or after being committed to the disk 118. To illustrate an example, after performing necessary changes to the computer device, such as installing/updating other programs (e.g., an operating system), modifying system settings and/or the like, the program 112 may invoke a (commit) command to schedule a commit process on the disk 118 after a next system reboot/restart.

In one implementation, the storage service 102 may respond to the requests from the filter driver 108 with portions of one or more files in the form of extents and/or extent information. These extents may comprise changed data blocks made by the program 112 while updating/installing the other programs, modifying the system settings and/or the like. Generally, the extent information may include various file system, volume and/or storage media (i.e., the disk 118) metadata and/or file offset mapping information. For each file, the file offset mapping information indicates a value representing an offset of an extent (e.g., a contiguous area of memory that comprises data for a file). The offset is used to locate each extent at a file level or a disk/sector level. The offset may be a number of bytes between a first address (e.g., an address associated with a beginning of the file, an address associated with a beginning of a volume in which the file resides, a sector location associated with the volume or the file and/or the like) and the extent. Alternatively, the extent information may be maintained locally by other kernel mode drivers and/or I/O system services associated with the I/O driver stack.

In one example implementation, a program 122 may issue input/output (I/O) operations 124 that are intended for protected volumes, but are intercepted by the filter driver 110, which may use various services (e.g., system services, such as I/O, storage and/or network services) and/or one or more kernel mode drivers to apply the I/O operations 124 to the overlay media 104. The file driver 110 may intercept the I/O operations 124 before being processed by the underlying input/output driver—at a file-level as in the file system driver or at a disk sector-level as in the disk or device driver—associated with a target storage device.

In one implementation, the filter driver 110 may connect to the storage service 102 and communicate the I/O operations 124 to the overlay media 104 with an identifier 126 that references a specific storage location (e.g., a partition or a folder). As an example, the I/O operations 124 may include disk write or disk read I/O Request Packets (IRPs). An IRP includes information necessary to fully describe an I/O operation/request (e.g., create or open file, write data, read data and/or the like) to compatible I/O system services and/or kernel mode drivers configured to handle the IRP. The storage service 102 includes implementations of these I/O system services and/or kernel-mode drivers. Each IRP comprises specific information for each driver in a layered driver stack (e.g., an I/O driver stack) that includes one or more functions to be performed by that driver. After completing these functions, each driver stores results data and/or metadata in the IRP and passes the updated IRP to a next driver, until completion or an error.

When the program 122 issues a request to read data (i.e., a read operation) for a current copy of a file of the protected volume stored on the disk 128, the filter driver 110 may instruct the storage service 102 to retrieve portions of the file corresponding with updated and/or new extents from the specific storage location. The storage service 102 may use appropriate I/O system services and/or kernel-mode drivers to access these portions and fulfill that request. The filter driver 110 may provide data from the storage service 102 to the program 122 along with any other file data stored on the disk 128. The filter driver 110 does not provide the program 122 with any deleted portions of the file because such portions correspond to a non-current point-in-time. Alternatively, the filter driver 110 may retrieve the data from an overlay cache 130 before such data may be transferred to the overlay media 104 as described herein.

When the program 122 issues a request to write data (i.e., a write operation) to a file of the protected volume on the disk 128, the filter driver 110 may instruct the storage service 102 to access the appropriate I/O system services and/or kernel-mode drivers and perform the necessary operations to fulfill that request. In one implementation, the storage service 102 stores the data in a file copy that includes only written data. In another implementation, the storage service 102 stores the data in a current snapshot layer being maintained in the overlay media 104 for the protected volume as described herein.

Alternatively, the filter driver 110 may use local I/O system services and kernel-mode drivers to store the data in a (cached) version of the file and/or the protected volume. For example, the filter driver 110 may write the data to a logical or virtual file copy embodying a physical version of the file on the disk 128, but at a later/current point-in-time (i.e., updated). Such a file copy may include extents comprising the written data and logical or virtual extents (e.g., placeholders such as pointers, references and/or the like) representing unchanged physical extents of the file on the disk. The filter driver 110 may store the file copy on an overlay cache 130. The overlay cache 130 may reside on RAM or on another volume used by the filter driver 110, for example. In one implementation, the filter driver 110 may transfer the file copy to the overlay media 104 for storage on a snapshot layer corresponding to the protected volume at a particular point-in-time or in a separate location that is not associated with the snapshot layer.

Similar to the filter driver 108, the filter driver 110 may commit data corresponding to write operations to the protected volume on local and/or network overlay-protected storage media, such as the disk 128, whereby file (e.g., operating system or application files) changes may persist after a device or system restart. As another example, the filter driver 110 may redirect the write operations to the overlay cache 130, which may store changes made to a file system that may be deleted when the device or system restarts and restores a protected/original state.

Changes made to the protected volume on the overlay-protected storage media by various programs may be embodied in an image type known as a snapshot and stored in snapshots 132 of the overlay media 104. Each snapshot of the snapshots 132 may include one or more snapshot layers that correspond to a volume state at a particular point-in-time. For example, every snapshot layer added to an existing snapshot creates a new, updated snapshot corresponding to a later point-in-time.

When a snapshot layer for a current point-in-time is added to the existing snapshot, the resulting group of snapshot layers, in combination with unchanged data on the protected volume, may represent a run-time image on which an operating system may mount a file system and run various programs. Hence, the snapshots 132 may form a chronological history of the volume from an original state and a current state. In one example implementation, updating the protected volume on the overlay-protected storage media with any one snapshot of the snapshots 132 causes all write operations associated with each inclusive snapshot layer to be applied to create a volume state that is point-in-time consistent.

In one example implementation, the identifiers 116 and 126 may include system-specific unique identifiers that are generated by the write filter drivers 108 and 110, respectively, or universally unique IDs (UUIDs) that may be generated from local hardware information. An example universally unique ID may include a CPU serial number, motherboard serial number and/or network card MAC address or a combination thereof. The example universally unique ID may be used as a name of a (Cloud) folder in which all blocks of data are stored for a particular device.

Figure 2:
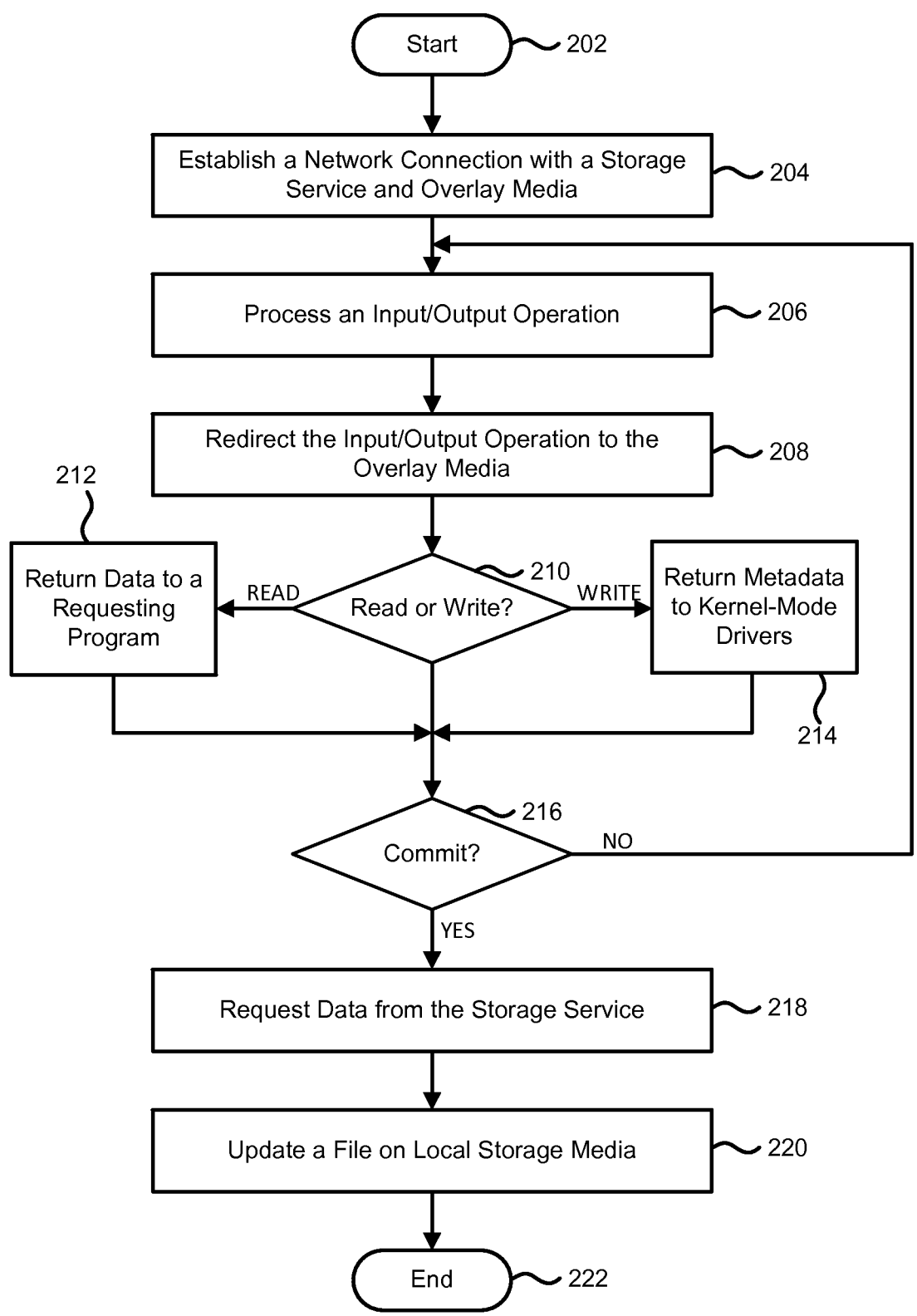
FIG. 2 is a flow diagram illustrating example steps for communicating with overlay media over a network connection according to one example implementation.

FIG. 2 is a flow diagram illustrating example steps for communicating with overlay media over a network connection according to one example implementation. Steps depicted in FIG. 2 may be performed by an I/O filter driver, such as the filter driver 108 or the filter driver 110. These steps commence at step 202 and proceed to step 204 where a network connection is established with a storage service and overlay media. As described herein, in one implementation, the storage service may be located using a common Cloud ID and URL and the overlay media may be a portion of a shared storage resource in the form of a data store, such as a folder.

Step 206 represents processing an I/O operation directed to local storage media, such as a disk, from an application. In a layered I/O driver stack, the I/O filter driver intercepts the I/O operation before reaching a lower layered kernel mode driver. Step 208 illustrates the redirection of the I/O operation to the overlay media via the storage service. Step 210 refers to a determination as to whether the I/O operation is a read operation or a write operation. The read operation in general refers to any one of a variety of "ReadFile" function calls by an application requesting file data. The write operation in general refers to any one of a variety of "WriteFile" function calls. If the I/O operation is the read operation, step 210 proceeds to step 212. Step 212 depicts returning data from the overlay media to the requesting application. In one implementation, the I/O filter driver instructs the storage service to locate current data (blocks) associated with a file corresponding to the read operation. The I/O filter driver provides the current data to the requesting application as if such data were actually stored in the local storage media. After performing step 212, an example method illustrated by FIG. 2 proceeds to step 220 at which the method ends.

If the I/O operation is the write operation, step 210 proceeds to step 214. Step 214 refers to returning various metadata from the storage service to kernel-mode drivers in the I/O driver stack. In one implementation, the I/O filter driver provides an I/O manager driver, a file system driver and/or a device driver with extent information pertaining to new and/or updated data blocks currently stored in the overlay media. These drivers may use such information to maintain point-in-time consistent file system information and create an overlay pointer that represents a storage location in the overlay media for one or more new and/or update data blocks. When a program issues a request to read such data, instead of providing a pointer to a sector or a file address on a disk, the I/O filter driver uses the overlay pointer to request and/or locate the corresponding data block(s).

Step 216 refers to determining whether to commit one or more accumulated write operations to local and/or network overlay-protected storage media. In one implementation, step 216 determines whether to commit data corresponding to one or more snapshot layers. A user may issue a commit command that stores the data (e.g., flushes all write operations) to a protected volume on the overlay-protected storage media. If the write operation is to be committed, step 216 proceeds to step 218. If the write operation is not to be committed, step 216 returns to step 206 and processes another I/O operation.

Step 216 is directed to requesting data associated with the write operation from the storage service. In one implementation, a (cached) version of the file with such data is sent. Step 220 refers to updating the file on the local and/or network overlay-protected storage media with the requested data. Step 222 terminates the example steps depicted in FIG. 2.

Figure 3:
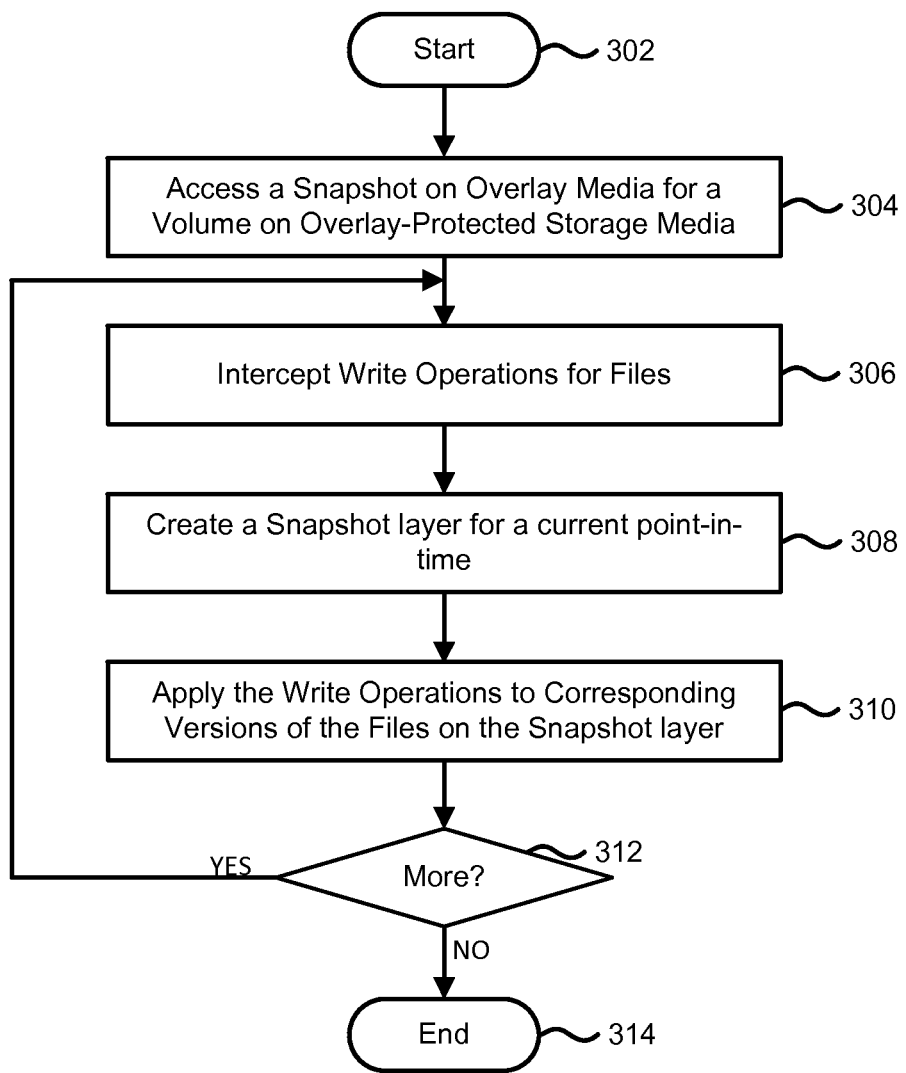
FIG. 3 is a flow diagram illustrating example steps for maintaining an image on overlay media for a volume on local storage media according to one example implementation.

FIG. 3 is a flow diagram illustrating example steps for maintaining an image on overlay media for a volume on local storage media according to one example implementation. Steps depicted in FIG. 3 may be performed by an I/O filter driver, such as the filter driver 108 or the filter driver 110. These steps commence at step 302 and proceed to step 304 where a snapshot on overlay media for a volume on local storage media is accessed. As described herein, the snapshot layer is a type of image (file) representing a state of the protected volume at a particular point-in-time. When the snapshot and the protected volume are aggregated, a resulting image constitutes an updated run-time image that is bootable/mountable by an embedded device/system and consistent with the particular point-in-time. In one implementation, the snapshot accessed during step 304 is associated with a point-in-time after a last restored point-in-time (i.e., an original state).

Step 306 is directed to intercepting write operations for files and redirecting the write operations to an overlay media via a storage service. Step 308 represents the creation of a snapshot layer for a current point-in-time. In one implementation, the I/O filter driver instructs the storage service to create the current snapshot layer. Step 310 refers to the application of the write operations to corresponding versions of the files on the current snapshot layer. The corresponding file versions may be a cached file copy that includes logical addresses that represent physical addresses at a file-system level or sector level. For example, some file portions (e.g., extents) may map to different and/or non-adjacent sectors on disk, but a file system may represent the file as a contiguous area of memory having a sequence of physical addresses. Alternatively, the overlay media may maintain a representation (e.g., an image) of the disk as an embodiment of a current state of the protected volume(s) and to indicate which sectors store new/updated versions of the file. Hence, the write operations may be applied at a sector-level.

In one implementation, within the current snapshot layer, logical file (i.e., byte) addresses corresponding to physical (on disk) addresses that are to be unchanged are left blank while logical addresses for physical counterparts that are to be updated with new/updated data are marked as "changed" and embedded with a reference to the new/updated data. Accordingly, the current snapshot layer only includes the new/updated data that may be written to the volume, if committed. Step 312 refers to a determination whether there are more write operations to intercept. If there are more write operations, step 312 returns to step 306 at which the current snapshot layer is added to the snapshot accessed during step 304. If there are no more write operations to intercept and redirect, step 312 proceeds to step 314 at which example steps are terminated.

Figure 4:
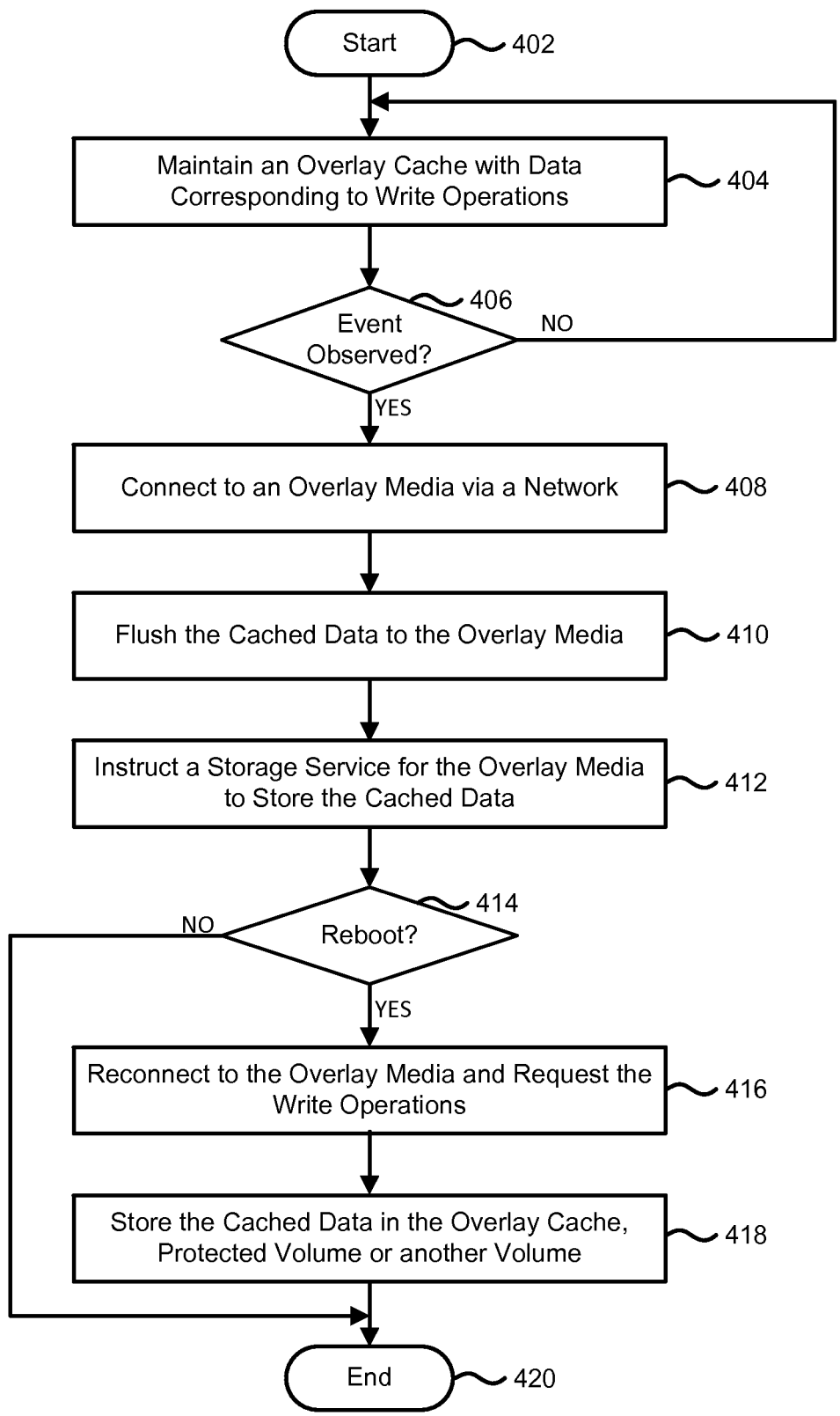
FIG. 4 is a flow diagram illustrating example steps for transferring data between overlay cache and overlay media according to one example implementation.

FIG. 4 is a flow diagram illustrating example steps for transferring data between an overlay cache and an overlay media according to one example implementation. Steps depicted in FIG. 4 may be performed by an I/O filter driver, such as the filter driver 108 or the filter driver 110. These steps commence at step 402 and proceed to step 404 where an overlay cache is maintained with data corresponding to write operations. In one implementation, the overlay cache is a RAM-based overlay that stores such data before being transferred, over a network connection, to overlay media. Step 406 determines whether an event triggering a data transfer is observed. An example event includes an embedded device/system shutdown. Another example event includes a size limit of the overlay cache being exceeded. Yet another example event is a timed flush or manual flush event. If the event is not observed, step 406 returns to step 404 where more write operations are stored and/or maintained in the overlay cache.

If the event is observed, step 406 proceeds to step 408. Step 408 refers to connecting to the overlay media via a network, such as the Internet or a local area network. Step 410 refers to flushing the cached data corresponding to the write operations to the overlay media. Step 412 is directed to instructing a storage service for the overlay media to store the cached data. Step 414 determines whether the embedded device/system is being rebooted/restarted. In one implementation, if the event is a pending shutdown, then the embedded device/system is to be rebooted. If the embedded device/system is being rebooted/restarted, step 414 proceeds to step 416. If the embedded device/system is not to be rebooted/restarted, step 414 proceeds to step 420 at which the example steps described in FIG. 4 end. Step 416 refers to reconnecting to the overlay media during the reboot and requesting the cached data corresponding to the write operations. Step 418 refers to storing the cached data in the overlay-protected storage media and updated the protected volume. Alternatively, the cached data may be stored in the overlay cache or another volume following the reboot to ensure that retain a previous state of the protected volume. Step 420 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
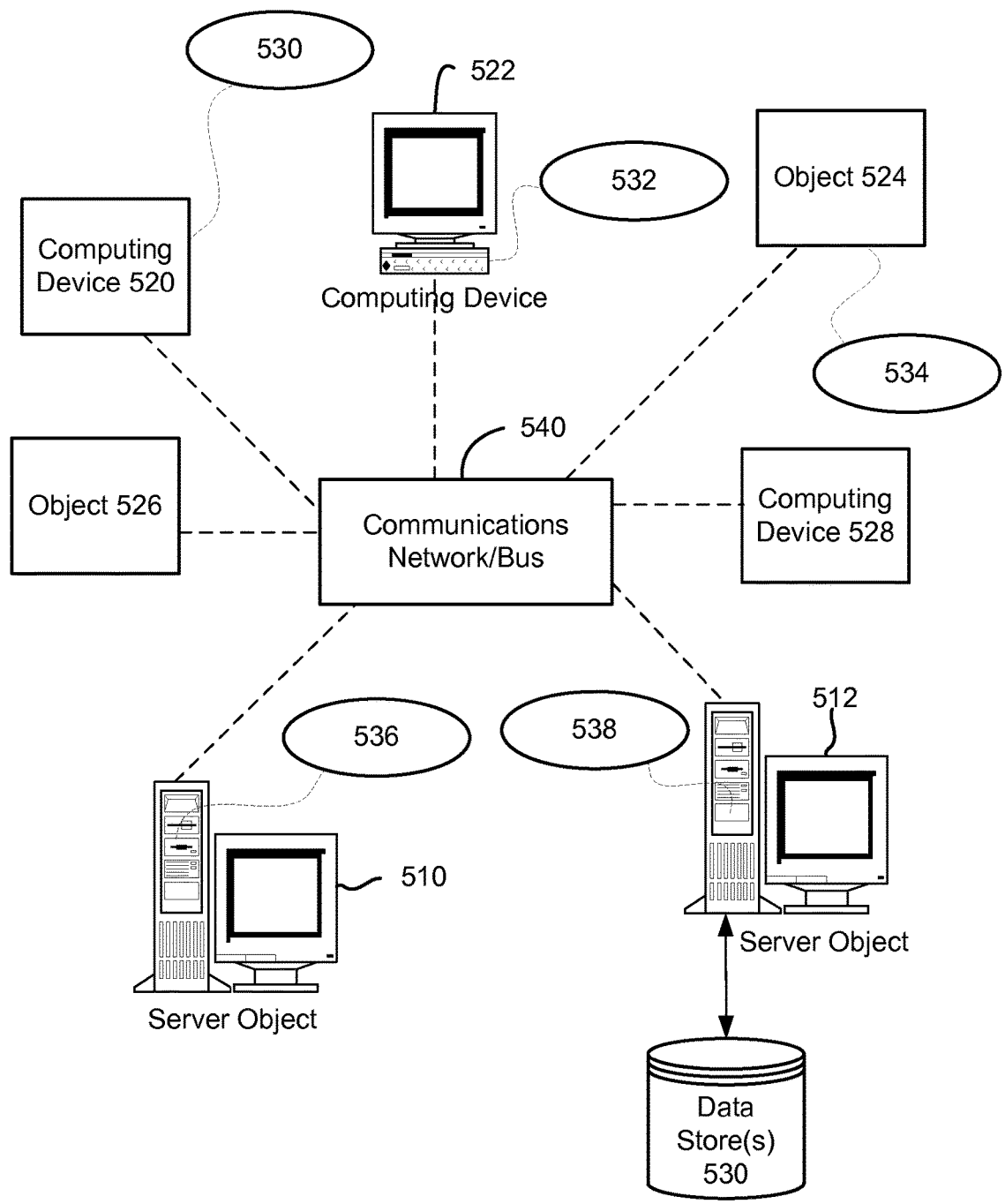
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
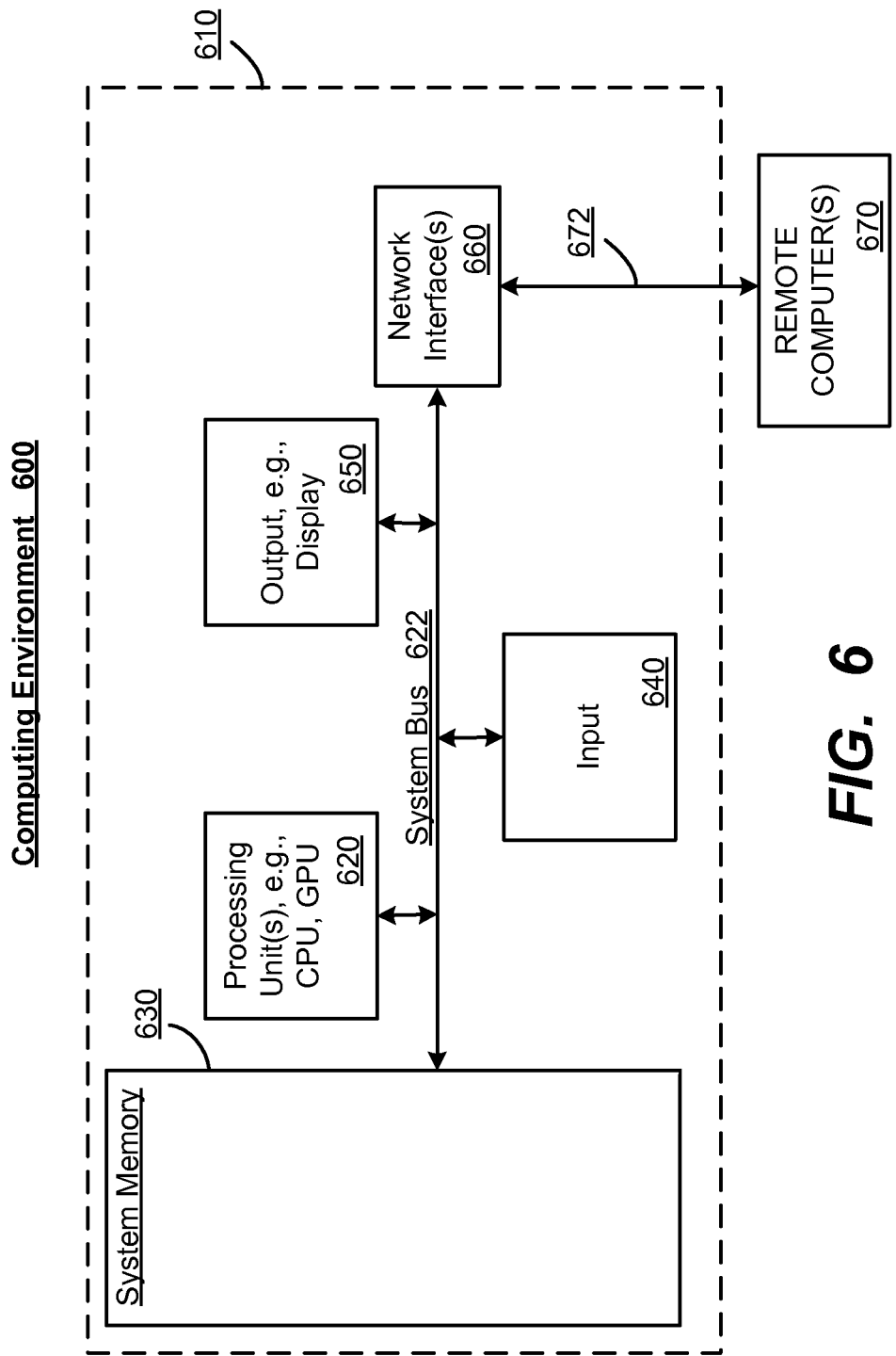
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a computer implemented method for providing overlay media via a cloud computing service over a network connection, the method comprising:
   intercepting input/output operations directed to a protected local storage volume; and
   redirecting, via a filter, the input/output operations to the overlay media using the cloud computing service over the network connection, via a uniform resource locator and a common cloud identifier utilized to communicate data with the overlay media.

2. The method of claim 1, wherein intercepting the input/output operations further comprises intercepting a write operation for a file and storing data corresponding to the write operation on the overlay media.

3. The method of claim 2 further comprising applying the write operation to a version of the file on a snapshot layer on the overlay media.

4. The method of claim 2 further comprising committing the data to the protected local storage volume.

5. The method of claim 2 further comprising storing the data in a version of the file in an overlay cache.

6. The method of claim 5 further comprising transferring the data from the overlay cache to the overlay media in response to an event.

7. The method of claim 5 further comprising applying the write operation to a cached version of the file.

8. The method of claim 5, wherein intercepting the input/output operations further comprises retrieving at least a portion of the data from the overlay cache.

9. The method of claim 1, wherein intercepting the input/output operations further comprises intercepting a read operation for a file and retrieving at least a portion of the file from the overlay media.

10. The method of claim 1, wherein the protected local storage volume is in a first volume state at a first point-in-time, the method further comprising maintaining a snapshot layer on the overlay media that, in combination with a portion of the protected local storage volume, represents the protected local storage volume in a second volume state at a second point-in-time.

11. In a computing environment, a system for intercepting input/output operations directed to a protected local storage volume, the system comprising:
   a computing device communicatively coupled to a cloud computing service server, the cloud computing service server comprising a cloud-based overlay media, the cloud computing service having a uniform resource locator associated therewith, the computing device comprising one or more processors, the protected local storage volume, and a filter driver, wherein, upon execution of the one or more processors, the filter driver is configured to:
   maintain data corresponding to write operations on the cloud-based overlay media over a network connection;
   using the uniform resource locator and a common cloud identifier utilized to communicate data with the cloud-based overlay media, retrieve data from the cloud-based overlay media corresponding to read operations for the protected local storage volume; and
   store the data corresponding to the write operations on the protected local storage volume in response to a commit command.

12. The system of claim 11, wherein the cloud-based overlay media comprises a snapshot layer, the cloud computing service server configured to apply the write operations to the snapshot layer on the cloud-based overlay media, and communicate the data corresponding to the read operations to the filter driver.

13. The system of claim 11, wherein, upon execution of the one or more processors, the filter driver is further configured to instruct the cloud computing service server to create, on the cloud-based overlay media, a snapshot layer corresponding to a volume located at least in part on the protected local storage volume.

14. The system of claim 13, wherein, upon execution of the one or more processors, the filter driver is further configured to maintain multiple snapshot layers corresponding to chronological points-in-time of the volume.

15. The system of claim 11, wherein the computing device further comprises an overlay cache, wherein, upon execution of the one or more processors, the filter driver is further configured to:
   maintain data corresponding to write operations on the overlay cache; and
   transfer the data corresponding to the write operations from the overlay cache to the cloud-based overlay media in response to a pending computing device shutdown.

16. One or more computer memory devices having computer-executable instructions, which upon execution perform operations, the operations comprising:
   intercepting write operations directed to an overlay-protected volume on local storage media;
   accessing a network connection using a uniform resource locator associated with a cloud computing service that controls a cloud-based overlay media; and
   instructing the cloud computing service to apply the write operations on the cloud-based overlay media, using the uniform resource locator and a common cloud identifier utilized to communicate data with the cloud-based overlay media.

17. The one or more computer memory devices of claim 16 having further computer-executable instructions comprising:
   in response to a commit command, requesting corresponding versions of files associated with the write operations from the cloud computing service; and
   updating the local storage media to be point-in-time consistent.

18. The one or more computer memory devices of claim 16 having further computer-executable instructions comprising:
   instructing the cloud computing service to return data from a portion of the cloud-based overlay media.

19. The one or more computer memory devices of claim 16 having further computer-executable instructions comprising:
   transferring data associated with the write operations from the cloud-based overlay media to the overlay-protected volume during a system reboot.

20. The system of claim 11, wherein the computing device further comprises a local overlay media.

* * * * *